United States Patent Office.

JOHN LONGMAID, OF NEW YORK, N. Y.

Letters Patent No. 95,028, dated September 21, 1869.

IMPROVED PROCESS FOR PRESERVING EGGS.

The Schedule referred to in these Letters Patent and making part of the same.

To all whom it may concern:

Be it known that I, JOHN LONGMAID, of the city, county, and State of New York, have invented a new and improved Process for Preserving Eggs; and I do hereby declare that the following is a full, clear, and exact description thereof, which will enable others skilled in the art to make and use the same.

This invention relates to a new and useful improvement in preserving eggs for market and use, and consists in the process hereinafter described, whereby eggs may be preserved, fresh and fit for use, for an indefinite period of time.

In carrying out my invention, I, in the first place, deposit the eggs (more or less in number) in a tightly-closed vessel, from which I extract the air, by means of an air-pump, or by any other suitable means. This extracts the air from the air-cell in the end of the eggs, and, in consequence of the porosity of the shell, more or less air is extracted from the whole contents of the shell, but the main object is to produce sufficient vacuum to draw the air from the air-cell before mentioned. When this is done, I inject, from a suitably-charged reservoir, connected with the vessel containing the eggs, carbonic-acid gas, in sufficient quantity to replace the air which has been extracted from the eggs.

The eggs may now be taken from the vessel and covered (by immersion or otherwise) with any suitable material for filling the pores of the shell. Oleaginous or mucilaginous substances are suitable for this purpose, or lime-water may be used with good results.

Instead of injecting carbonic-acid gas after the air has been extracted from the air-cells in the eggs, I may inject either of the above-mentioned substances for filling the pores of the shell, but I prefer to fill the air-cells with the carbonic gas, as it renders the process more complete.

The substance for filling the shell-pores may be injected before the eggs are taken from the vessel, or immediately after the introduction of the carbonic-acid gas, if desired, the vessel being slightly agitated, to insure the perfect covering of each egg with the liquid.

Having thus described my invention,

What I claim as new, and desire to secure by Letters Patent, is—

The above-described process for preserving eggs, substantially as set forth.

JOHN LONGMAID.

Witnesses:
 GEO. W. MABEE,
 ALEX. F. ROBERTS.